C. W. FRENCH.
VEHICLE WHEEL.
APPLICATION FILED OCT. 5, 1907.

915,585.

Patented Mar. 16, 1909.

Witnesses:

Inventor
Charles W. French
By James L. Norris
Atty.

though the tire is preferably rigid and may be provided with a
UNITED STATES PATENT OFFICE.

CHARLES W. FRENCH, OF KINGFIELD, MAINE.

VEHICLE-WHEEL.

No. 915,585.     Specification of Letters Patent.     Patented March 16, 1909.

Application filed October 5, 1907. Serial No. 396,071.

*To all whom it may concern:*

Be it known that I, CHARLES W. FRENCH, a citizen of the United States, residing at Kingfield, in the county of Franklin and State of Maine, have invented new and useful Improvements in Vehicle-Wheels, of which the following is a specification.

My present invention relates to improvements in wheels, and especially of the kind adapted for use on automobiles and similar vehicles, and it has for its object to provide an improved device of this character embodying cushioning devices for absorbing the shock due to irregularities in the surface of the road, the cushioning effect being accomplished without the use of the usual pneumatic tire, the cost of maintenance of which is objectionable.

Another object of the invention is to provide a wheel of this character wherein the cushioning devices are capable of adjustment for the purpose of centering the tire relatively to the axis of the wheel and also for varying the strength of the cushioning devices according to the weight imposed on the wheel so that the desired degree of resilience may be obtained.

To these and other ends, the invention consists in certain improvements, and combinations and arrangements of parts, all as will be hereinafter more fully described, the novel features being pointed out particularly in the claims at the end of the specification.

Figure 1:
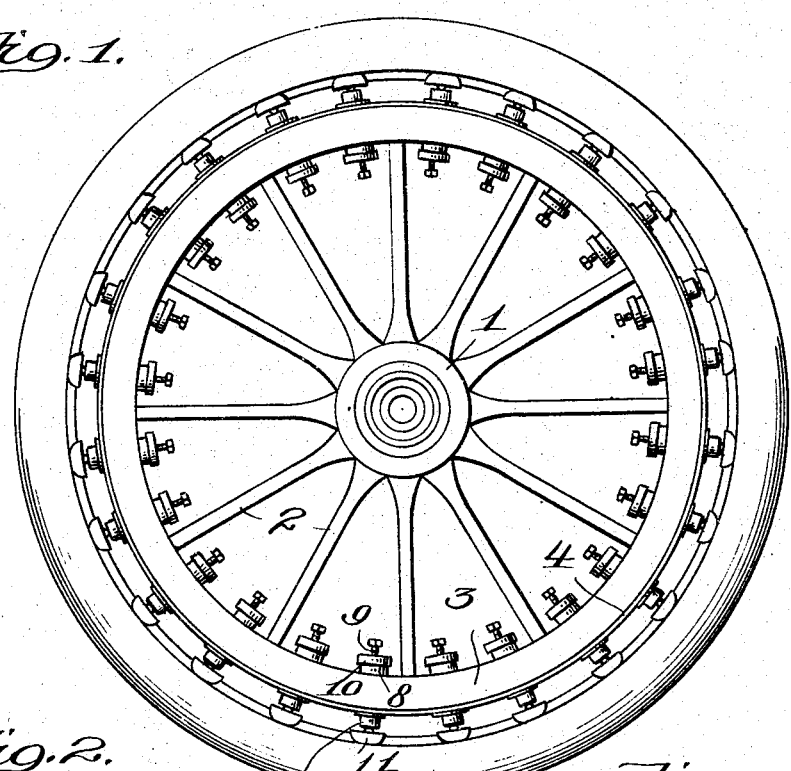
Figure 2:
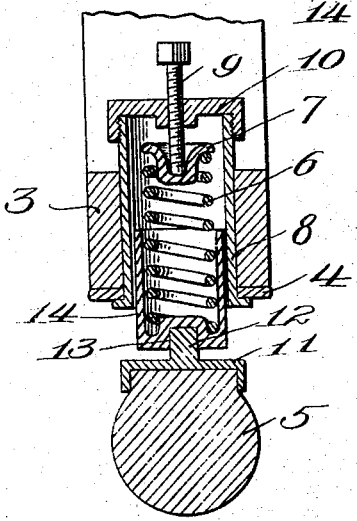
Figure 3:
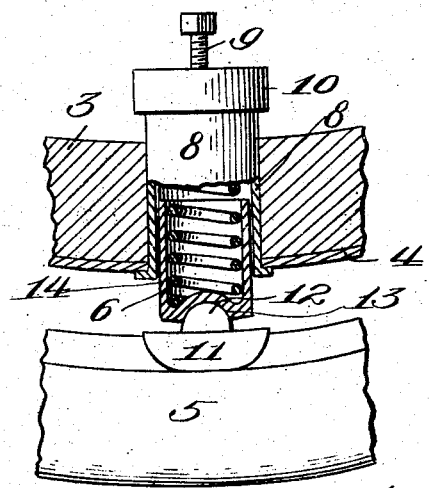

In the drawing—Figure 1 is a side elevation of a wheel constructed in accordance with my invention; Fig. 2 represents the transverse section of a portion of the wheel showing one of the cushioning devices; Fig. 3 is a sectional view of the cushioning device shown in Fig. 1, taken in the plane of rotation of the wheel.

Similar parts are designated by the same reference characters in the several figures.

The invention is shown in the present instance as applied to a wheel embodying generally a hub 1 having a set of radial spokes 2, and an outer ring 3 which connects the outer ends of the spokes and corresponds substantially to the usual felly, it being preferably rigid and may be provided with a metallic or other rigid tire 4. This outer ring is surrounded by a flexible tire 5 which is preferably composed of solid rubber or other material which is capable of yielding when it engages stones or other irregularities in the surface of the road, and is capable of obtaining a firm hold on the latter so as to prevent lateral skidding.

The cushioning devices are interposed between the flexible tire and the rigid portion of the wheel, and they embody a set of radially arranged members which normally act to force the flexible tire outwardly from the axis of the wheel and maintain the tire centered relatively thereto. The cushioning devices are arranged between the spokes of the wheel, and any desired number thereof may be employed, two cushioning devices being arranged between each pair of adjacent spokes in the present instance in order that the cushioning devices may act at numerous points about the circumference of the flexible tire to produce uniform cushioning action and prevent flattening of the tire.

In that form of the invention shown in the accompanying drawing, the inner ends of the springs 6 coöperate with spring seats 7, and in order to enable the several springs to be adjusted for the purpose of centering the flexible tire relatively to the axis of the wheel and to enable the tension of each spring to be adjusted, and these inner spring seats are preferably adjustable in a direction radially of the wheel, each spring seat being mounted within a tubular casing or member 8, a set screw or equivalent device 9 being threaded into a cap 10 which is threaded into a cap 10 which is threaded or otherwise detachably mounted upon the inner end of the tubular member 8, this set screw coöperating with the inner spring seat 7 and providing means whereby the latter may be adjusted in a direction toward and from the center of the wheel. The cushioning device shown in this form of the invention also embodies a cushion seat 11 which is suitably mounted on the inner periphery of the flexible tire and provided with a central inwardly extending projection 12 which has its upper surface curved in the plane of rotation of the wheel, the lateral sides of the projection being substantially parallel and arranged in the plane of rotation of the wheel, and this projection is adapted to coöperate with a socket 13 of corresponding form which is formed in the outer end of an inner tubular member 14 which latter serves not only as a casing to inclose the lower end of the spring 6, but also as a telescopic guide which coöperates with the tubular member 8 carried by the ring or felly 3, this member 8 being composed in the present instance of a tube flanged or otherwise suitably secured to prevent inward movement thereof relatively to the ring 3, and it serves to incase the upper portion of the spring. The inner telescopic member 14 of the cushion which has a pivotal bearing upon the tire, constitutes a radially movable plunger, and it also serves to incase the outer portion of the spring and thereby protect it, and the socket upon this member coöperates with the projection 12 upon the cushion seat in such a manner as to permit a relative pivotal movement between the cushioning device and the tire due to the irregularities in the road surface, although a lateral or upsetting movement of the tire or a relative disengagement between the tire and the cushioning device is prevented. By providing a detachable cap or other suitable part upon the outer tubular member 8 which part carries the set screw or other spring-adjusting device, it is possible to remove the inner telescopic member and spring after this cap has been detached, it being unnecessary to dismount the tire from the wheel in order to inspect or repair the cushioning devices. In the present case the springs serve as cushioning devices that permit the tire to yield relatively to the body of the wheel and thereby absorb shock or vibrations due to the irregularities in the surface of the road, and under normal conditions the tire will be centered relatively to the axis of the wheel.

The adjusting devices not only enable the several springs to be adjusted individually to center or true the tire relatively to the axis of the wheel, but they also enable the tension of the several springs to be adjusted according to the weight that is imposed upon the wheel, so that the wheels are capable of being applied to vehicles of different weight without impairing the efficiency of the cushioning devices, and wheels embodying them are especially adapted for use on the rear shafts of motor vehicles for the reason that the turning effort imparted to the wheels for the purposes of propulsion is transmitted from the body of the wheel to the road engaging tire by the plungers which are maintained in relative position by the bearings or guides provided by the outer ring 3.

In the present instance I have illustrated and described what I now consider to be the best embodiment of my invention, but it will be understood, of course, that the wheel may be constructed in various ways without sacrificing the advantages of the invention or departing from the spirit thereof, as defined in the claims.

I claim as my invention—

1. A vehicle wheel comprising a felly, a tire surrounding it, and a set of cushioning devices spaced radially about the wheel and forming a resilient connection between the felly and surrounding tire, each cushioning device embodying a tubular member immovably secured in the felly, an inner member movably mounted telescopically within the tubular member and having a detachable connection with the tire, a spring inclosed within the tubular member and having its outer end arranged to act upon said inner member to force it outwardly, a spring seat arranged within the tubular member and coöperating with the inner end of said spring, a device for adjusting the said spring seat to vary the power of said spring, the inner end of said tubular member having an opening sufficiently large to permit the passage therethrough of said spring, seat and inner member, and a part detachably connected to and closing the said opening at the inner end of the tubular member and carrying said spring seat adjusting device, the spring and inner telescopic member being removable from the tubular member after detachment of said part therefrom.

2. A vehicle wheel comprising a felly, a flexible tire surrounding it, and a set of cushioning devices spaced about the wheel and forming a resilient connection between the felly and surrounding tire, each cushioning device embodying a tubular member immovably secured in the felly and having its inner end arranged at the inner side thereof, a cushion seat arranged at the inner side of the flexible tire, an inner member movable telescopically within said tubular member and having its outer end bearing upon said cushion seat, a spring having its outer end bearing upon said inner telescopic member, a spring seat inclosed within the tubular member and coöperating with the inner end of said spring, the inner end of said tubular member having an opening sufficiently large to permit the passage therethrough of said spring, seat and inner member, a cap detachably mounted on and closing the said opening at the inner end of said tubular member, and a set screw carried by and extending through said cap and coöperating with said spring seat whereby the tension of the spring may be adjusted.

3. A vehicle wheel comprising an inflexible felly, a flexible tire surrounding the felly, a set of seats mounted for independent radial movement and engaging the inner side of the flexible tire, and a set of cushioning devices for the respective seats, each cushioning device comprising a pair of tubular members, one member being fitted immovably in the felly and having its inner end closed, and the other member telescoping within the immovable member and having a closed outer end, the said outer end being provided with a recess having parallel walls lying in the plane of rotation of the wheel, and inwardly extending projections formed on the respective seats on the tire and engaging in the said recess, said projections having parallel side walls lying in the plane of rotation of the wheel and arranged to coöperate with the corresponding walls of the respective recess to permit pivotal movements of the seat in the plane of rotation of the wheel only, and a cushioning spring acting upon the movable member.

4. A vehicle wheel comprising an inflexible felly, a flexible tire surrounding it, a set of cushioning devices each comprising a tubular member mounted immovably in the felly and having its inner end closed, a second member telescoping within the immovable member and having a wall closing its outer end and forming a recess, the lateral walls of which are parallel and lie in the plane of rotation of the wheel, an inward projection being formed on said wall opposite to said recess, and a spring inclosed within said tubular members, one end being centered by the inwardly extending projection, and the other end of the spring engaging a part on the immovable member, and a set of seats mounted at the inner side of the flexible tire and capable of independent radial movements, each seat being provided at its inner side with a projection which rests in said recess and having walls lying in the plane of rotation of the wheel to coöperate with the corresponding walls of the recess whereby pivotal movements of the seats is permitted and upsetting of the tire is prevented.

In testimony whereof I have hereunto set my hand in presence of two subscribing witnesses.

CHARLES W. FRENCH.

Witnesses:
WM. D. FRENCH,
S. J. WYMAN.